United States Patent
Cheon et al.

(10) Patent No.: US 8,771,870 B2
(45) Date of Patent: Jul. 8, 2014

(54) SECONDARY BATTERY HAVING A SEALING GASKET WITH CONCAVE AND CONVEX PORTIONS

(75) Inventors: Sang-Eun Cheon, Suwon-si (KR); Jae-Kyung Kim, Suwon-si (KR); Hye-Won Yoon, Suwon-si (KR); Seok-Yoon Yoo, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 645 days.

(21) Appl. No.: 12/436,749

(22) Filed: May 6, 2009

(65) Prior Publication Data

US 2009/0214948 A1  Aug. 27, 2009

Related U.S. Application Data

(62) Division of application No. 11/251,295, filed on Oct. 14, 2005, now Pat. No. 7,544,440.

(30) Foreign Application Priority Data

Oct. 28, 2004 (KR) .................. 10-2004-0086599

(51) Int. Cl.
| H01M 2/02 | (2006.01) |
| H01M 2/04 | (2006.01) |
| H01M 2/06 | (2006.01) |
| H01M 2/08 | (2006.01) |

(52) U.S. Cl.
USPC ........... 429/181; 429/163; 429/164; 429/174; 429/180; 429/185

(58) Field of Classification Search
USPC .............. 429/163, 164, 174, 180, 181, 185
See application file for complete search history.

(56) References Cited

U.S. PATENT DOCUMENTS 5,916,707 A * 6/1999 Omaru et al. ................. 429/163
2004/0126656 A1 7/2004 Cho

FOREIGN PATENT DOCUMENTS

| CN | 1508891 A | 6/2004 |
| JP | 52-84619 | 6/1977 |
| JP | 05-246457 | 9/1993 |
| JP | 10112300 A * | 4/1998 |
| JP | 10-199495 | 7/1998 |
| JP | 11-283588 | 10/1999 |
| JP | 11-307067 | 11/1999 |
| JP | 2000-277067 | 10/2000 |
| JP | 2000-353503 | 12/2000 |
| JP | 2004-079469 | 3/2004 |
| JP | 2004-119067 | 4/2004 |

OTHER PUBLICATIONS

Machine translation of JP 10112300 A, Tagou et al., Apr. 1998.*
Machine translation of JP 2004079469 A, Inoue, Mar. 2004.*

(Continued)

*Primary Examiner* — Sean P Cullen
(74) *Attorney, Agent, or Firm* — Christie, Parker & Hale, LLP (57) ABSTRACT

A secondary battery includes an electrode assembly having a positive electrode, a negative electrode and a separator interposed between the positive and negative electrodes and a container for receiving the electrode assembly inside thereof. The secondary battery also includes a cap assembly fixed to the container to seal the container and a gasket disposed between the container and the cap assembly. The gasket has at least one concavo-convex portion on a surface contacting the container and/or the cap assembly. This improved gasket structure enhances the air tightness of the secondary battery.

8 Claims, 9 Drawing Sheets

(56) References Cited

OTHER PUBLICATIONS

Machine translation of JP 11283588 A, Morishita et al., Oct. 1999.*

Patent Abstracts of Japan for Publication No. 10-199495; Date of publication of application Jul. 31, 1998, in the name of Maeda Noriji et al.

* cited by examiner

SECONDARY BATTERY HAVING A SEALING GASKET WITH CONCAVE AND CONVEX PORTIONS

CROSS-REFERENCE TO RELATED APPLICATION

This application is a divisional of U.S. patent application Ser. No. 11/251,295 filed on Oct. 14, 2005, now U.S. Pat. No. 7,544,440 which claims priority to and the benefit of Korean Patent Application No. 10-2004-0086599 filed in the Korean Intellectual Property Office on Oct. 28, 2004, the entire content of both of which are incorporated herein by reference.

BACKGROUND OF THE INVENTION

1. Field of the Invention

The present invention relates to a secondary battery, and more particularly, to a gasket structure for a secondary battery which may enhance the gas or fluid tightness of the battery.

2. Description of the Related Art

Unlike a conventional primary battery, a conventional secondary battery may be recharged. Lower power batteries in which one battery cell is made into a battery pack are used as the power source for various portable electronic devices such as cellular phones, laptop computers, and camcorders. Bulk size batteries which are formed by connecting plural secondary battery cells serially or in parallel may be suitable as the power source for electric vehicles.

Depending on their external shape, secondary batteries may be classified into different types, for example, square and cylindrical batteries.

Conventional secondary batteries include an electrode assembly in which a positive electrode and a negative electrode of a long belt shape, and a separator as an inserted inside a container, and a cap assembly is mounted on the container to form the battery.

The cap assembly seals the opening of the container to maintain the inner gas or fluid tightness of the container. For cylindrical batteries, when the cap assembly is coupled with the container, a separate gasket is interposed between the cap assembly and the container to maintain the inner tightness. However, a gap between the cap assembly and the container is created in spite of the gasket, thereby decreasing the tightness of the secondary battery.

That is, when the cap assembly is inserted into the container through the gasket and assembled with the container by a clamping process, since the surface of the conventional gasket contacting the container and the cap assembly has a flat shape, the tightness is poor.

Especially if the gasket is not uniformly pressed during the clamping process of the container, the gasket may become irregularly distorted so that some portions of the gasket do not contact the container or the cap assembly, thereby widening the gap.

In addition, for square batteries, when a flat gasket is disposed between the cap plate and the external terminal, the gasket may unevenly contact the adjacent member to create a gap.

SUMMARY OF THE INVENTION

A secondary battery is provided with enhanced gas or fluid tightness by having an improved gasket structure.

According to one embodiment of the present invention, a secondary battery includes an electrode assembly including a positive electrode, a negative electrode and a separator interposed between those two electrodes; a container receiving the electrode assembly inside thereof; a cap assembly fixed to the container to seal the container; and a gasket disposed between the container and the cap assembly; wherein the gasket has a bendable cylindrical end portion for contacting the container and/or cap assembly and at least one concavo-convex portion on the surface contacting the container and/or the cap assembly. The secondary battery may have, for example, a square or cylindrical shape.

The cap assembly may be pressed and assembled with the opening of the container through the gasket. Accordingly, even if the gasket is not uniformly pressed between the container and the cap assembly, the convex portion of the concavo-convex portion closely contacts the container and the cap assembly to maintain the air tightness between the cap assembly and the container.

At least one concavo-convex portion may be formed on the inner circumferential surface and/or the outer circumferential surface of the cylindrical gasket, the concavo-convex portion being spaced along the axial direction of the gasket. In addition, each of the concavo-convex portions may be continuously formed along the circumferential direction to have a ring-shaped belt configuration.

The concave portion and the convex portion forming the concavo-convex portion may have an arc cross-section.

In addition to the arc cross-section, the concave portion and the convex portion forming the concavo-convex portion may have various shapes such as a triangle cross-section, a square cross-section, etc.

Furthermore, the thickness of the convex portion forming the concavo-convex portion may be the same as the thickness of the gasket, or greater than the thickness of the gasket by attaching it to the surface of the gasket. Moreover, an O-ring may be disposed in the concavo-convex portion.

According to another aspect of the present invention, a secondary battery includes an electrode assembly including a positive electrode, a negative electrode and a separator interposed between those two electrodes; a container receiving the electrode assembly inside thereof; a cap plate fixed to the container to seal the container; an external terminal electrically connected to the electrode assembly and protruded outwardly passing through the cap plate; and a gasket disposed between the cap plate and the external terminal; wherein the gasket has at least one concavo-convex portion on the surface contacting with the cap plate and/or the external terminal.

DETAILED DESCRIPTION OF EMBODIMENTS

Figure 1:
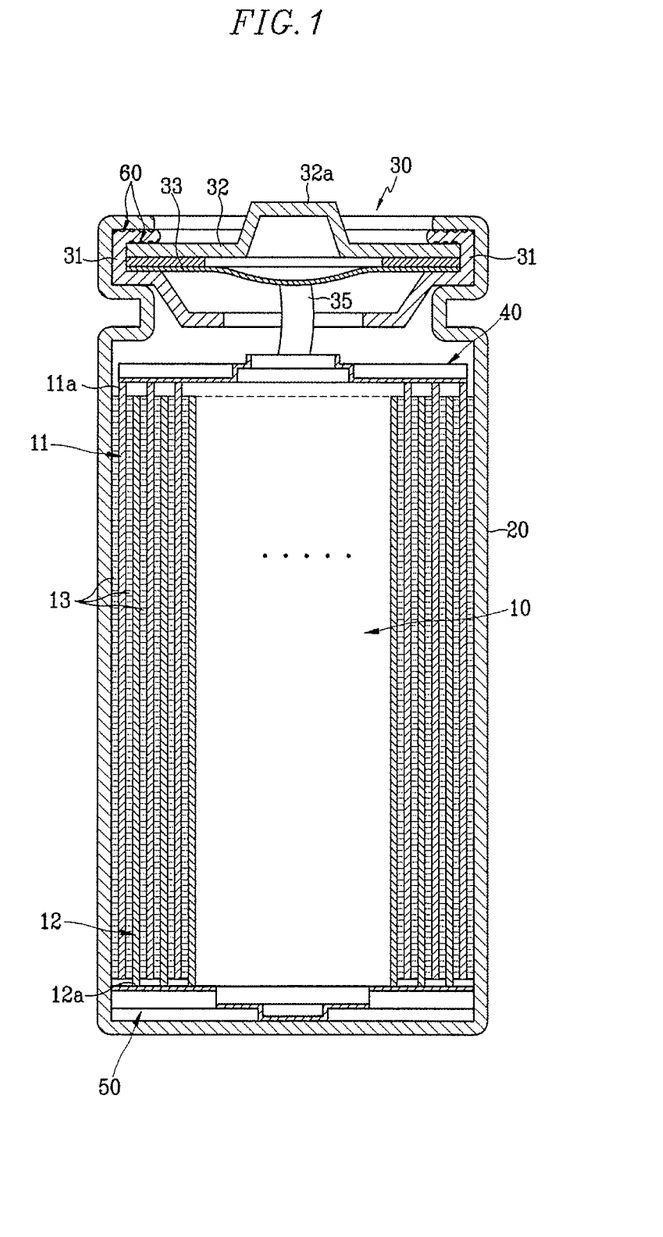
FIG. 1 is a cross-sectional view of a secondary battery according to an exemplary embodiment of the present invention.

As shown in FIG. 1, the secondary battery according to an exemplary embodiment includes an electrode assembly 10 having a positive electrode 11, a negative electrode 12 and a separator 13 interposed between the positive and the negative electrodes, a container 20 having an opening at one end thereof to receive the electrode assembly 10 inside the container together with an electrolyte, a cap assembly 30 mounted on the opening of the container 20 through a gasket 31 to thereby seal the container 20, a positive collector plate 40 electrically connected to the positive electrode 11 of the electrode assembly 10, and a negative collector plate 50 electrically connected to the negative electrode 12 of the electrode assembly 10.

The container 20 may be made of a conductive metal such as aluminum, aluminum alloy, and steel plated with nickel. The shape of the container according to the present embodiment may be a cylinder having an inner space to receive the electrode assembly 10. However the shape of the secondary battery is not limited thereto and may be, for example, a square, etc.

The electrode assembly 10 may have a stacked layer structure such that the separator 13 is placed between the positive electrode 11 and the negative electrode 12, or it may have a jellyroll structure such that the positive electrode 11, the negative electrode 12 and the separator 13 in a stacked layer are wound in a jellyroll configuration. FIG. 1 shows the electrode assembly 10 in a wound jellyroll configuration mounted inside the cylindrical container 20.

The electrode assembly 10 has the positive and negative collector plates 40, 50 electrically connected to the positive electrode 11 and the negative electrode 12, respectively. At a first end of the positive electrode 11, a positive uncoated region 11a which is absent positive active material is formed to be electrically connected to the positive collector plate 40.

In addition, at a second end of the negative electrode 12, a negative uncoated region 12a which is absent negative active material is formed to be electrically connected to the negative collector plate 50.

The cap assembly 30 includes a cap plate 32 having an external terminal 32a, and a vent plate 33 which is fracturable at a prescribed pressure level allowing gas to discharge to thereby prevent the explosion of the battery. The vent plate 33 is electrically connected to the positive collector plate 40 through a lead 35. The vent plate 33 may have various configurations as long as it serves to cut off the electrical connection between the external terminal 32a and the electrode assembly through the lead 35 at a prescribed pressure level.

Figure 2:
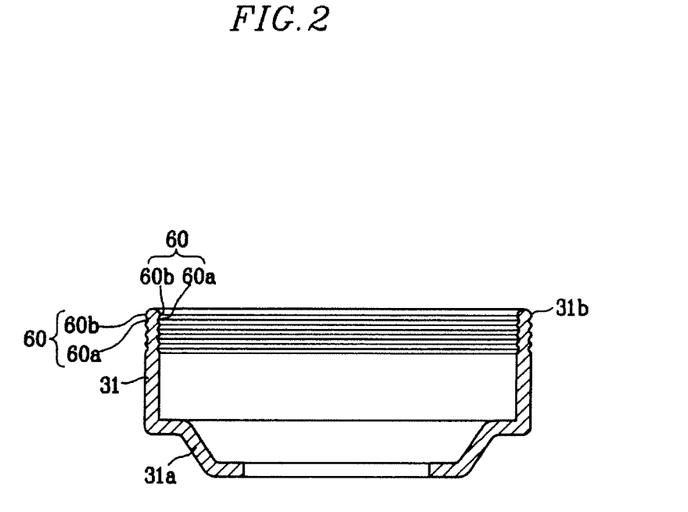
FIG. 2 is a cross-sectional view of a gasket of the secondary battery according to an exemplary embodiment of the present invention.

FIG. 2 is a cross-sectional view of a gasket 31 of the secondary battery according to FIG. 1. The drawing shows the gasket 31 before it is assembled with the opening of the container 20. The gasket 31 has the overall shape of a cylinder with openings at first and second ends 31a, 31b. The first end 31a of the gasket 31 facing the inside of the container 20 is cut and tapered toward the center of the gasket 31 to be disposed in the clamping portion of the container 20.

Figure 3A:
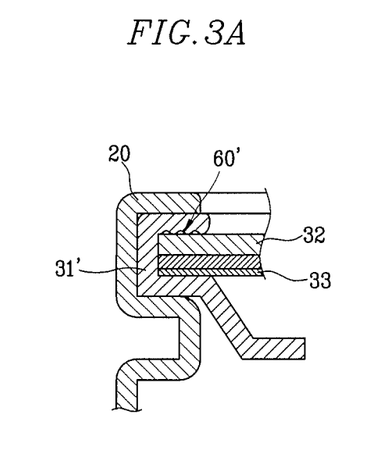
FIG. 3A is a partial cross-sectional view of a secondary battery according to another exemplary embodiment of the present invention.
Figure 3B:
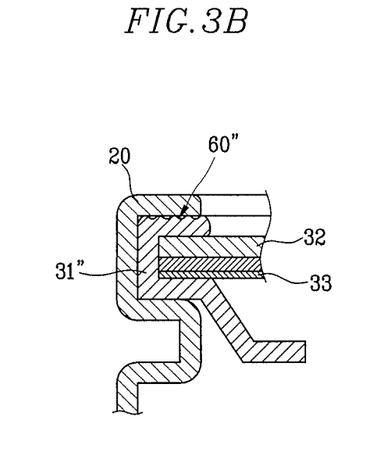
FIG. 3B is a partial cross-sectional view of a secondary battery according to yet another exemplary embodiment of the present invention.

The second end 31b of the gasket 31 is initially unfolded and then is cut and bent toward the cap plate 32 together with the container 20 when the container 20 is clamped (FIGS. 3a and 3b). Accordingly, the cut and bent inner circumferential surface and outer circumferential surface of the gasket 31 are in close contact with the cap plate 32 and the container 20, respectively.

The gasket 31 has at least one concavo-convex portion 60 at portions contacting the cap plate 32 and the container 20. The concavo-convex portion 60 may be formed on the inner circumferential surface and/or the outer circumferential surface of the gasket 31 to increase the tightness between the cap plate 32 and the container 20.

Although FIG. 2 shows the concavo-convex portions 60 formed on both the inner circumferential surface and the outer circumferential surface, the present invention is not limited thereto.

Accordingly, as shown in the FIG. 3A and FIG. 3B, the concavo-convex portions 60' and 60" may be formed on only the inner circumferential surface of the gasket 31' (FIG. 3A) or only on the outer circumferential surface of the gasket 31" (FIG. 3B).

When the concavo-convex portion 60' is formed only on the inner circumferential surface of the gasket 31', the tightness between the cap plate 32 and the gasket 31' is increased, and when the concavo-convex portion 60" is formed only on the outer circumferential surface of the gasket 31", the tightness between the container 20 and the gasket 31" is increased.

The concave portion 60a and the convex portion 60b of the concavo-convex portion 60 are continuous along the circumferential direction of the gaskets to form a ring shape. There may be a single concave portion 60a and convex portion 60b or there may be a plurality of such portions. When there are a plurality of such portions, the concave portion 60a and the convex portion 60b may be alternately arranged so that the cross-section thereof appears as a waveform.

As shown in FIG. 2, the cross-sections of the concave portion 60a and the convex portion 60b have an arc shape. However, the shapes of the concave portion 60a and the convex portion 60b are not limited thereto, and they may be various shapes such as a triangle cross-section, a square cross-section, etc.

The following will describe the manufacturing process of secondary batteries to illustrate the function of the gasket 31 with the above structure.

The electrode assembly 10 is inserted through the opening of the container 20, and the cap assembly 30 is assembled with the container 20 through the gasket 31 to form a secondary battery.

The container 20 and the cap assembly 30 are assembled in the following way. A receiving portion for the cap assembly 30 is formed at the upper portion of the container, and the cap assembly 30 is disposed in the receiving portion for the cap assembly 30 through the gasket 31. Then, the upper portion of the container 20 is clamped and thereby the container 20, the gasket 31 and the cap assembly 30 are in close contact to be integrally fixed.

Then, since both an inner surface and an outer surface of the gasket 31 have the concavo-convex portion 60, even if the container 20 is not uniformly pressed upon clamping the upper portion of the container 20, the concavo-convex portion 60 may be in close contact with the container 20 or the cap plate 32.

That is, when clamped, the convex portions 60b formed in the gasket 31 contact the container 20 and the cap plate 32 and the convex portions are compressed. Accordingly, even if the container 20 is not uniformly pressed, the convex portions 60b are always first contacted so that at least the convex portion 60b can be in close contact with the container 20 and, in turn, the cap plate 32.

The convex portion 60b has a belt configuration of a ring shape. Accordingly, when the gasket 31 is disposed between the container 20 and the cap plate 32, the gasket 31 is in close contact with the container 20 and the cap plate 32 so that the gap between the container 20 and the cap plate 32 may be stably sealed.

Figure 4:
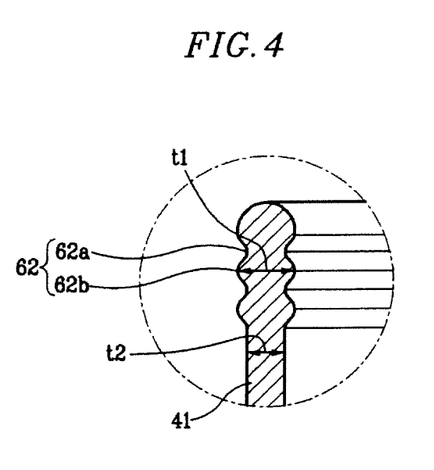
FIG. 4 is a partial enlarged cross-sectional view of a gasket of a secondary battery according to still another exemplary embodiment of the present invention.

With reference to FIG. 4, a concave portion 62a and a convex portion 62b forming a concavo-convex portion 62 have an arc cross-section. The concave portion 62a of an arc shape and the convex portion 62b of an arc shape are alternately arranged to form a waveform-appearing cross-section.

The convex portion 62b may protrude from the inner circumferential surface and the outer circumferential surface of a gasket 41. According to this structure, the distance between the convex portions 62b, that is, the thickness (t1) of the convex portion 62b is greater than the thickness (t2) of the gasket 41.

Figure 5:
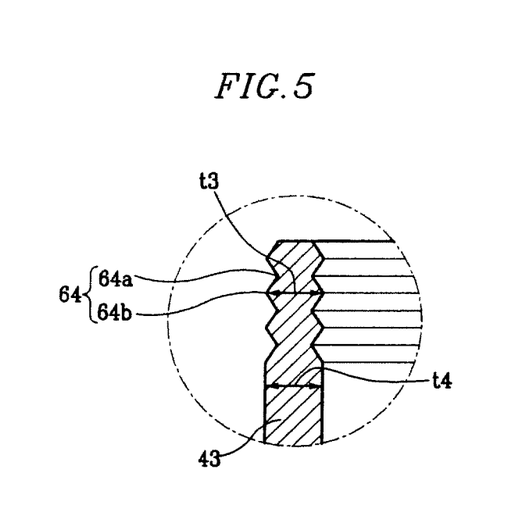
FIG. 5 is a partial enlarged cross-sectional view of a gasket of a secondary battery according to yet another exemplary embodiment of the present invention.

With reference to FIG. 5, a gasket 43 according to another exemplary embodiment has a concavo-convex portion 64 formed on its side surface. The concave portion 64a and the convex portion 64b forming the concavo-convex portion 64 have a triangle cross-section.

The concave portion 64a is formed on the inner circumferential surface and the outer circumferential surface of the gasket 43 and has a groove shape. According to this structure, the distance between the convex portions 64b formed in the inner circumferential surface and the outer circumferential surface of the gasket 43, that is, the thickness (t3) of the convex portion 64b corresponds to the thickness (t4) of the gasket 43.

Figure 6:
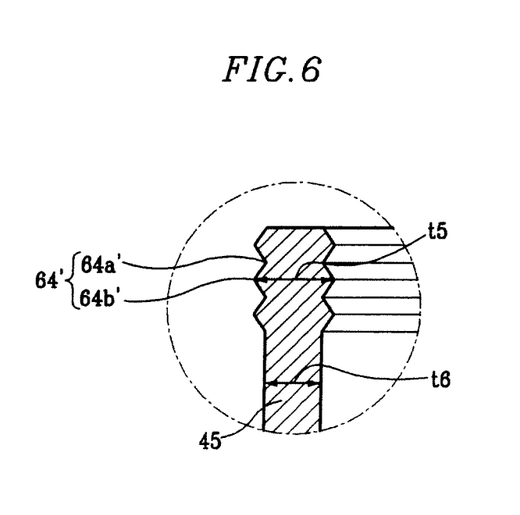
FIG. 6 is a partial enlarged cross-sectional view of a gasket of a secondary battery according to still another exemplary embodiment of the present invention.

With reference to FIG. 6, a gasket 45 according to another exemplary embodiment has a concavo-convex portion 64' formed on its side surface. The concave portion 64a' and the convex portion 64b' forming the concavo-convex portion 64 have a triangle cross-section. The thickness (t5) of the convex portion 64b may be greater than the thickness (t6) of a gasket 45. That is, the convex portion 64b of the gasket 45 protrudes outwardly from the gasket 45.

Figure 7:
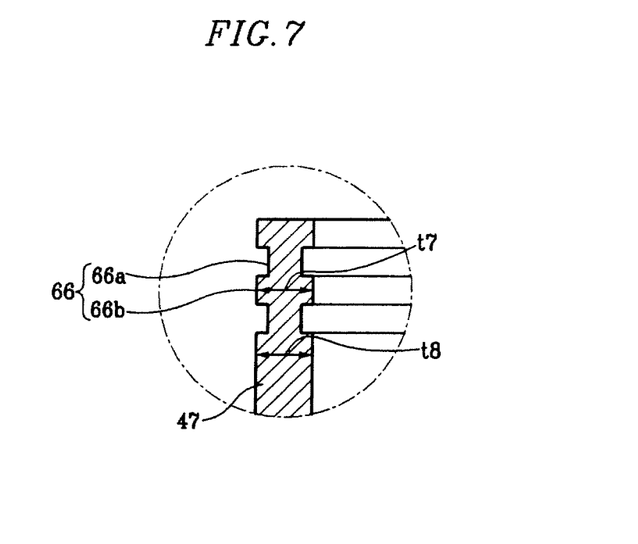
FIG. 7 is a partial enlarged cross-sectional view of a gasket of a secondary battery according to another exemplary embodiment of the present invention.

With reference to FIG. 7, a gasket 47 according to another exemplary embodiment has a concavo-convex portion 66 formed on its side surface. The concave portion 66a and the convex portion 66b forming the concavo-convex portion 66 have a square cross-section.

Figure 8:
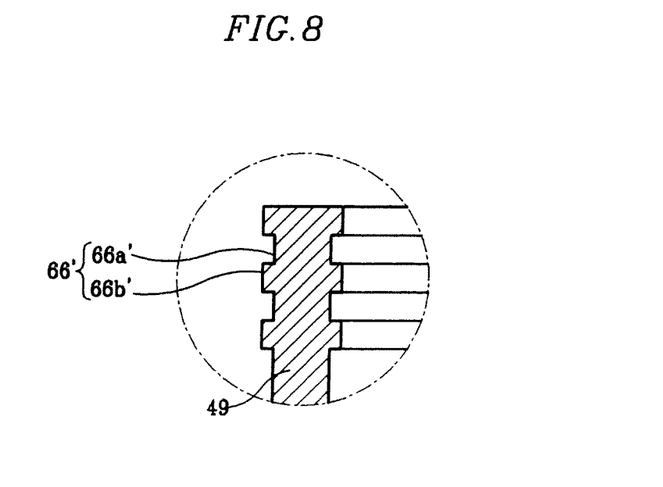
FIG. 8 is a partial enlarged cross-sectional view of a gasket of a secondary battery according to yet another exemplary embodiment of the present invention.

As is described above, the thickness (t7) of the convex portion 66b may be substantially the same as the thickness (t8) of the gasket 47 as shown in FIG. 7. With reference to FIG. 8, gasket 49 may include a concave portion 66a40 and a convex portion 66b', and the thickness of the convex portion 66b' may be greater than the thickness of a gasket 49.

If the thicknesses (t3, t7) of the convex portions 64b, 66b correspond to the thicknesses (t4, t8) of the gaskets 43, 47, when the gaskets 43, 47 are pressed between the cap plate and the container the pressure is principally applied to the convex portions 64b, 66b of the concavo-convex portions 64, 66 so that the convex portions 64b, 66b are closely contacted with the container and thereby compressed.

However, if the concavo-convex portions 64', 66' have convex portions 64b', 66b' protruding outwardly from the gaskets 45, 49, when the gaskets 45, 49 are pressed between the cap plate and the container, the convex portions 64b', 66b' are in close contact with the container and the cap plate and are thereby compressed. Since the convex portions 64b', 66b' protrude outwardly from the gaskets 45, 49, the cap plate and the container exert a greater pressure on these gaskets and they are in closer contact with the cap plate and the container.

Figure 9:
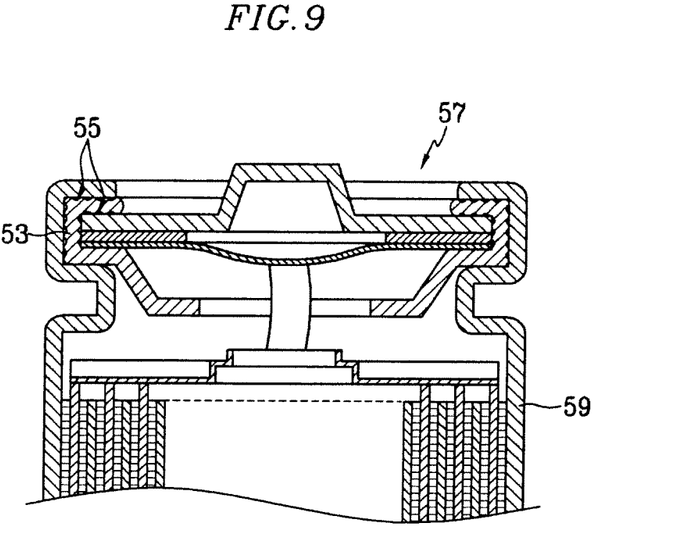
FIG. 9 is a partial cross-sectional view of a secondary battery according to still another exemplary embodiment of the present invention.

With reference to FIG. 9, the secondary battery according to this exemplary embodiment has a substantially similar structure to that of the secondary battery shown in FIG. 1. However, a concavo-convex portion 55 on a gasket 53 is formed to correspond to a top surface and a side surface of a cap assembly 57 when the gasket 53 is mounted in the container 59 together with the cap assembly 57.

That is, in this exemplary embodiment the concavo-convex portion 55 is arranged not only on the top surface but also on the side surface of the cap assembly 57 to more securely seal the gap between the cap assembly 57 and the gasket 53.

In addition, in this embodiment the concavo-convex portion 55 is arranged at portions where the inner top surface and side surface of the gasket 53 are contacted with respect to the container 59. Accordingly, the gap between the container 59 and the gasket 53 can be more securely sealed by the concavo-convex portion 55.

Figure 10:
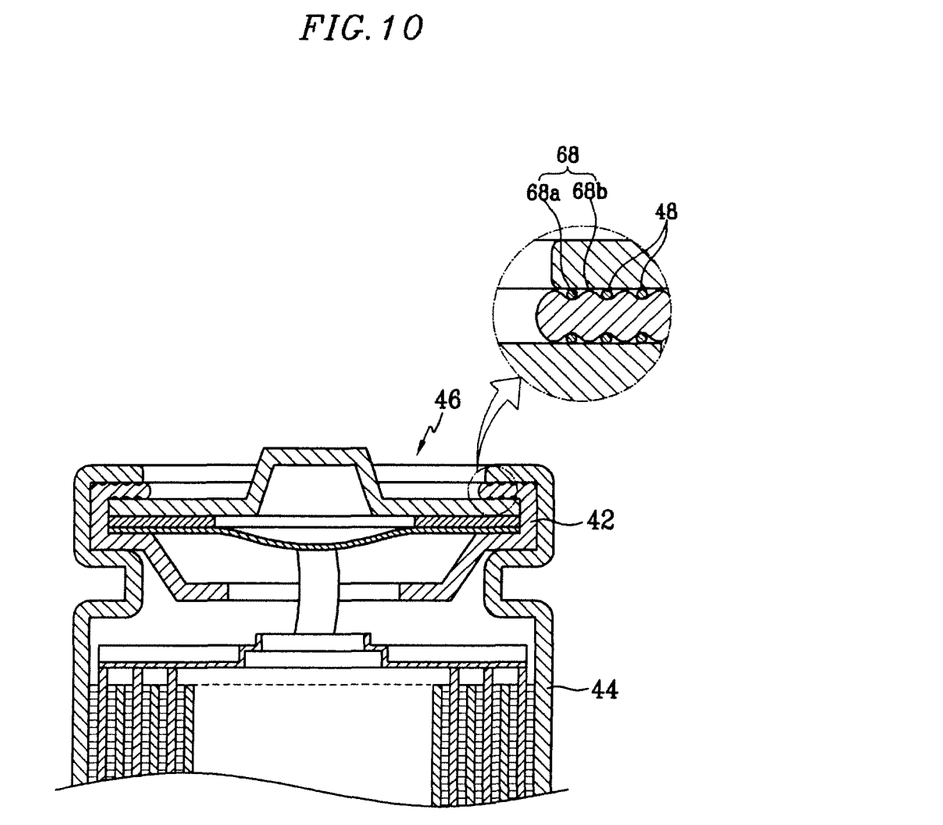
FIG. 10 is a cross-sectional view of a gasket and an O-ring mounted therein according to another exemplary embodiment of the present invention.

With reference to FIG. 10, a gasket 42 according to the present embodiment is disposed between a container 44 and a cap assembly 46, and has a concavo-convex portion 68 on the outside surface and the inside surface. The concavo-convex portion 68 has a concave portion 68a and a convex portion 68b like the other embodiments described above, and one or more O-rings 48 are mounted in respective concave portions 68a. The O-ring 48 has a structure such that it protrudes further outward from the convex portion 68b.

Accordingly, when the gasket 42 is disposed between the container 44 and the cap assembly 46, the O-ring 48 protruding outwardly is in close contact with the container 44 and the cap assembly 46 to fill the gap between the components so that the gap between the container 44 and the cap assembly 46 is securely sealed.

Although FIG. 10 shows a structure having multiple O-rings 48 on both surfaces of one gasket 42, the present invention is not limited thereto. The O-rings 48 may be disposed on multiple portions of the gasket 42 as shown in FIG. 9.

Figure 11:
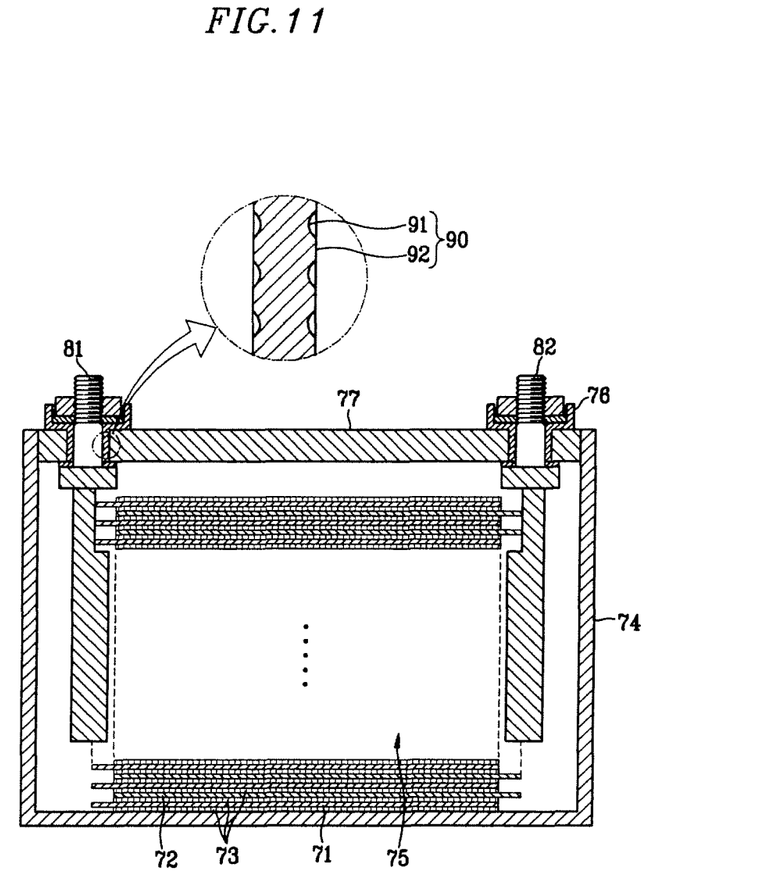
FIG. 11 is a cross-sectional view of a secondary battery according to yet another exemplary embodiment of the present invention.

With reference to FIG. 11, the secondary battery according to the present embodiment includes an electrode assembly 75 having a positive electrode 71, a negative electrode 72 and a separator 73 interposed between those two electrodes, a container 74 for receiving the electrode assembly 75, external terminals 81, 82 electrically connected to the electrode assembly 75, a cap plate 77 having a terminal receiving portion for receiving the external terminals 81, 82, the cap plate being fixed to the container 74 to seal the container, and a gasket 76 disposed between the cap plate 77 and the external terminals 81, 82.

The gasket 76 has a concavo-convex portion 90 formed on the surface contacting with the external terminals 81, 82 and the cap plate 77, and the concavo-convex portion 90 has a concave portion 91 being depressed and a convex portion 92 being protruded.

Although FIG. 11 shows that the concavo-convex portion 90 is formed on the inner surface and the outer surface of the gasket 76, the position and the size of the concavo-convex portion 90 is not limited thereto. Accordingly, the concavo-convex portion 90 may be formed on both of the outer surface and the inner surface, or it may be formed on either of the outer surface or the inner surface.

The concave portion 91 according to the present embodiment has an arc cross-section and the convex portion 92 has a truncated arc cross-section. However, the shapes of the concave portion 91 and the convex portion 92 are not limited thereto, and they may have various shapes such as a triangle cross-section, a square cross-section, etc.

The portion where the external terminals 81, 82 are inserted into the cap plate 77 has a cylindrical shape, and the gasket 76 has a hollow cylindrical shape to be in close contact with the external terminals 81, 82.

The concavo-convex portion 90 formed in the gasket 76 is continuously formed along the circumferential direction of the gasket 76. Accordingly, the concavo-convex portion 90 is formed on the outer circumferential surface and the inner circumferential surface of the gasket 76, and has a ring shape. Such a concavo-convex portion 90 of a ring shape is in close contact with the external terminals 81 and 82 and the cap plate 77 to seal them.

In addition, at least one concavo-convex portion 90 is formed along the axial direction of the gasket 76. Although FIG. 11 shows that a plurality of the concave portion 91 and the convex portion 92 are alternately arranged to form a waveform appearing cross-section, the present invention is not limited thereto, the gasket may include as few as one concavo-convex portion 90 or as many as necessary arranged or any desired pattern.

The convex portion 92 protrudes further outwardly from the portion of the gasket 76 where the concave portion 91 is formed. Accordingly, if the gasket 76 is disposed between the gap plate 77 and the external terminals 81 and 82, the convex portion 92 is in closer contact with the cap plate 77 and the external terminals 81 and 82.

In addition, although it is not shown in FIG. 11, one or more O-rings may be disposed in the concavo-convex portion 90, and the O-ring may be in close contact with the external terminals 81 and 82 and the cap plate 77 to more securely seal them.

The secondary battery of the present invention may be used as the power source for motor driving devices such as the hybrid electric vehicles, electric vehicles, wireless vacuum cleaners, motorbikes, or motor scooters.

According to the present invention, even if the press molding process of the container is poor upon assembling of the container and the cap assembly, the disclosed gasket enables the container and the cap assembly to be in close contact to thereby increase their gas or fluid tightness. Accordingly, the reliability of the battery is enhanced and the life span of the battery is increased.

Although exemplary embodiments of the present invention have been shown and described, it will be appreciated by those skilled in the art that changes may be made in this embodiment without departing from the principles and spirit of the invention, the scope of which is defined in the claims and their equivalents.

What is claimed is:

1. A secondary battery, the secondary battery comprising:
a container;
a cap assembly fixed to the container to seal the container;
a gasket, the gasket having a bent end portion having a first surface configured to contact the container and a second surface opposite the first surface and configured to contact the cap assembly, and the gasket having a plurality of concave and convex portions on at least one of the first and second surfaces at the bent end portion; and
at least one O-ring in at least one of the plurality of concave and convex portions.

2. The secondary battery of claim 1, wherein the gasket has a plurality of concave and convex portions on the first and second surfaces at the bent end portion.

3. A secondary battery, comprising:
a container;
a cap assembly fixed to the container to seal the container; and
a gasket between the container and the cap assembly, the gasket having a bent end portion configured to contact the container and/or the cap assembly;
wherein a plurality of concavo-convex portions are on an inner circumferential surface of the bent end portion and an outer circumferential surface of the bent end portion along an axial direction of the gasket;
wherein the plurality of concavo-convex portions are continuously along a circumference of the gasket; and
wherein the secondary battery further comprises at least one O-ring in at least one of the plurality of concavo-convex portions.

4. The secondary battery of claim 3, wherein the plurality of concavo-convex portions each include a concave portion and a convex portion, the concave portion and the convex portion having an arc cross-section.

5. The secondary battery of claim 3, wherein the plurality of concavo-convex portions each include a concave portion and a convex portion, the concave portion and the convex portion having a triangle cross-section.

6. The secondary battery of claim 3, wherein the plurality of concavo-convex portions each include a concave portion and a convex portion, the concave portion and the convex portion having a square cross-section.

7. The secondary battery of claim 6, wherein the gasket comprises a body portion and the thickness of the convex portion is substantially equal to the thickness of the body portion.

8. The secondary battery of claim 6, wherein the gasket comprises a body portion and the thickness of the convex portion is greater than the thickness of the body portion.

* * * * *